(12) United States Patent
Ogata

(10) Patent No.: US 6,283,094 B1
(45) Date of Patent: Sep. 4, 2001

(54) PRESSURE VALVE

(75) Inventor: Kiyotaka Ogata, Saitama (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,750

(22) PCT Filed: Jun. 30, 1999

(86) PCT No.: PCT/DE99/01897

§ 371 Date: May 15, 2000

§ 102(e) Date: May 15, 2000

(87) PCT Pub. No.: WO00/01936

PCT Pub. Date: Jan. 13, 2000

(30) Foreign Application Priority Data

Jul. 2, 1998 (DE) ............................................. 198 29 553

(51) Int. Cl.[7] ........................... F02M 41/00; F16K 17/26
(52) U.S. Cl. ........................ 123/467; 123/506; 137/493.3
(58) Field of Search .................................... 123/467, 506, 123/495; 137/493.1, 493.3, 493.4, 493.6, 493.8, 493.9; 417/503, 307, 499, 489, 296

(56) References Cited

U.S. PATENT DOCUMENTS

| | | | |
|---|---|---|---|
| 1,999,967 | * | 4/1935 | Miller et al. ........................ 123/467 |
| 4,577,606 | * | 3/1986 | Bohringer et al. .................... 123/506 |
| 4,651,779 | * | 3/1987 | Filippi et al. ...................... 137/493.3 |
| 5,293,897 | * | 3/1994 | Warga et al. ....................... 137/493.3 |
| 5,295,469 | * | 3/1994 | Kariya et al. ......................... 123/456 |

FOREIGN PATENT DOCUMENTS

| 196 49 541 A1 | * | 6/1998 | (DE) . |
| 197 10 891 A1 | * | 9/1998 | (DE) . |

* cited by examiner

Primary Examiner—Henry C. Yuen
Assistant Examiner—Mahmoud Gimie
(74) Attorney, Agent, or Firm—Ronald E. Greigg; Edwin E. Greigg

(57) ABSTRACT

A pressure valve for installation in a feed line between a fuel injection pump and an injection site of an internal combustion engine to be supplied. The valve has at least one movable valve member, embodied as a valve ball, which can be brought by a restoring spring into contact with a valve seat A spring plate is provided between the restoring spring and the valve ball and has a spherical surface for guiding the valve ball, and a bearing face, remote from this spherical guide face, for the restoring spring. This spherical surface that guides the valve ball is intended to be interrupted at the spring plate.

8 Claims, 2 Drawing Sheets

PRESSURE VALVE

PRIOR ART

The invention is based on a pressure valve for a fuel injection pump. One such pressure valve, known from an earlier German Patent Application, DE 197 10 891.1, is inserted into a feed line between a pump work chamber of a fuel injection pump and an injection site of the internal combustion engine to be supplied by the pressure valve. This known pressure valve, acting as an equal-pressure valve, has a valve body inserted into a tubular stub forming a valve housing. The valve body has an axial through conduit and, with its end face remote from the pump work chamber, it forms a first valve seat. A pressure valve closing member that opens in the direction of the injection site is guided in the axial through conduit of the valve body and is held with a sealing face on the first valve seat by the force of a first valve spring. An axial through bore is disposed in the pressure valve closing member; this through bore can be closed by a reverse-flow valve that opens in the direction of the pump work chamber. In the known pressure valve, this reverse-flow valve is embodied as a ball valve, to which end the movable valve member is embodied as a valve ball. This valve ball can be brought into contact, by a restoring spring forming a second valve spring, with a valve seat face of the pressure valve closing member that opens in the direction of the injection site, and a spring plate as provided between the restoring spring and the valve ball. This spring plate has a spherical surface guiding the valve ball and a bearing face, remote from this spherical guide face, for the restoring spring.

The known pressure valve has the disadvantage that when the reverse-flow valve, embodied as a ball valve, opens, a backup pressure is built up at the edge toward the spring plate. Consequently a backup cushion develops over time between the valve ball and the spherical surface of the spring plate; although this does allow the spring plate to execute a relatively long stroke, the valve ball cannot follow this opening stroke motion. Thus an overly small outflow cross section is opened at the ball valve, and thus the flow rate at the reverse flow valve of the known pressure valve is insufficient or fluctuates, and the equal-pressure valve thus functions incorrectly. Furthermore, because of the backup pressure cushion between the valve ball and the spring plate and its irregular collapse, in conjunction with vibration in the outflowing fuel in the feed line, the result is that the valve ball alternatingly lifts up from and hammers onto the guide face of the spring plate, which causes increased wear of the contact faces of the spring plate and the valve ball. Furthermore, because of the higher spring stress, breakage of the restoring spring occurs more often, so that the reliability and service life of the ball valve inside the pressure valve is restricted considerably.

ADVANTAGES OF THE INVENTION

The pressure valve according to the invention has the advantage over the prior art that by the provision of interruptions in the closed ball guide face on the spring plate, the buildup of a backup pressure can be averted. The valve ball during the opening stroke motion of the ball valve thus follows in the opening stroke direction without any restriction in the deflection motion of the spring plate, thus uncovering an adequate opening cross section of the valve seat face, which makes a uniform fuel transfer at the ball valve possible. Lifting of the spring plate from the valve ball can also be averted, so that the spring plate does not execute a separate, longer stroke, and thus puts less stress on the restoring spring. An alternating lifting up and hammering down of the valve ball on the spring plate can also be averted, which considerably reduces the mechanical wear of these components.

The interruptions of the spherical surface, guiding the valve ball, on the spring plate are preferably embodied as obliquely extending recesses, by which on the one hand a sharp stream deflection point of the outflowing fuel and thus a backup pressure point can be avoided, and furthermore a connection of the spherical guide face with the rear spring chamber can be made. A lesser fuel pressure prevails in this rear spring chamber, so that because of the pressure drop to the outflowing fuel, no backup pressure can build up. The recesses or interruptions in the closed spherical guide face of the spring plate can alternatively be embodied as bores, slits or indentations instead; what is essential is that there be an interruption in the closed contact face between the valve ball and the spherical surface. Another advantage is attained by chamfering the transitional face between the radial circumferential wall face of the cylindrical spring plate and the end face of the spring plate toward the valve ball. This chamfering of the end face of the spring plate, in addition to the polished sections on the spring plate, enables an improved flow past the spring plate. Inclination angles of the chamfer of approximately 30° to 45° to the longitudinal axis of the spring plate are especially advantageous. It is also especially advantageous for the angles of inclination of the oblique polished face at the spherical surface and the chamfer on the face end of the spring plate to have the same angle from the longitudinal axis, preferably 300. To further improve the fuel transfer at the spring plate, axial polished faces, preferably three of them, are also provided on its cylindrical circumferential wall surface. The guidance of the spring plate in the axial direction is effected in a structurally simple way via the remaining cylindrical wall web regions, which are guided slidingly displaceably along the wall of the valve body. To guarantee a secure contact of the restoring spring, which urges the valve ball in the closing direction, with the spring plate, the bearing face of the restoring spring on the spring plate is embodied as an annular end face, which is adjoined radially inward by a remaining tanglike region, which is surrounded by the restoring spring.

The embodiment of the spring plate of the ball valve according to the invention is described here taking as an example a pressure valve for installation in a feed line between a fuel injection pump and an injection site of the internal combustion engine to be supplied, but it can also be used in all other ball valves, such as simple check valves.

Further advantages and advantageous refinements of the subject of the invention can be learned from the drawing, description and claims.

BRIEF DESCRIPTION OF THE DRAWINGS

FIG. 1 shows a sectional view of the pressure valve of the invention, with a first exemplary embodiment of the spring plate.

FIG. 2 shows the spring plates individually and enlarged in two views in, and in which the recesses in the spherical surface of the spring plate are embodied as oblique polished sections; and FIG. 3 illustrates a second exemplary embodiment of the spring plate corresponding to the view in FIG. 2, in which the recesses in the spherical surface of the spring plate are embodied as bores.

DESCRIPTION OF THE EXEMPLARY EMBODIMENTS

Figure 1:
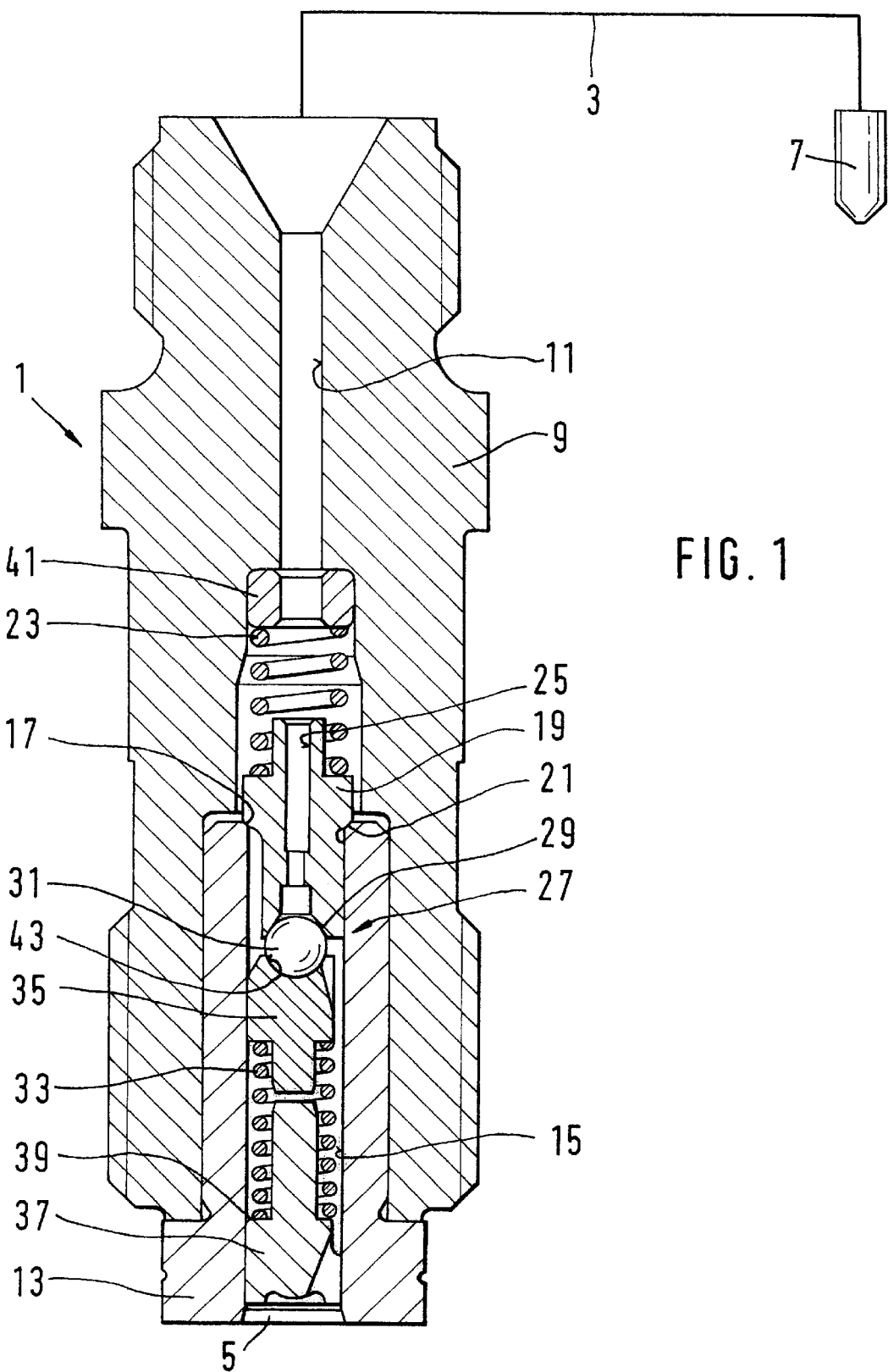
FIGS. 1 to 3 show two exemplary embodiments of the pressure valve of the invention are shown in the drawings and will be described in further detail below.

The pressure valve, shown in FIG. 1 in longitudinal section and embodied as an equal-pressure valve 1 is intended in the exemplary embodiment to be inserted into a feed line 3 between the pump work chamber 5 of a fuel injection pump, not shown in further detail, and an injection site, embodied as a fuel injection valve 7, into the combustion chamber of the engine to be supplied.

The pressure valve 1 has a valve housing 9, which has a stepped through bore 11 that forms part of the feed line 3. The pressure valve 1 also has a tubular valve body 13, which is inserted, toward the pump work chamber, into the through bore 11 of the valve housing 9. The valve body 13 has an axial through conduit 15 and, at the transition between its annular end face remote from the pump work chamber and the through conduit 15, the valve body has a preferably conical first valve seat face 17. Cooperating with this first valve seat face 17 is a piston-shaped pressure valve closing member 19, which has a conical sealing face 21 and is guided in part axially displaceably in the axial through conduit 15. The pressure valve closing member 19 is held in contact with the first valve seat 17 by a valve spring 23 and opens in the direction of the injection site 7 if the fuel pressure exceeds the closing force of this valve spring 23.

The pressure valve closing member 19 has an axial through bore 25, which is closable by a reverse-flow valve 27, embodied as a ball valve, that opens in the direction of the pump work chamber 5. The annular end face, toward the pump work chamber 5, of the pressure valve closing member 19 forms a second valve seat face 29, with which the movable valve member, embodied as a ball 31, of the reverse-flow valve 27 cooperates. The valve ball 31 of the reverse-flow valve 27 is held in contact with the second valve seat 29 by a restoring spring 33 via a spring plate 35; on the other side, the restoring spring 33 is braced stationary relative to the valve body 13. For designing the opening stroke motion of the valve ball 31 or the spring plate 35, a stop piece 37 is inserted into the through conduit 15 of the valve body 13; the maximum opening stroke motion of the valve ball 31 can be adjusted by way of the depth to which the stop piece 37 is inserted. An end face of the stop piece 37 oriented toward the valve ball 31 forms a stop limiting face, which cooperates with an end face toward it of the spring plate 35. The restoring spring 33 is braced on an annular shoulder 39 of the stop piece 37 and radially surrounds the part of the stop piece 37 that has the stop face. The valve spring 23 urging the pressure valve closing member 19 in the closing direction is braced on the other side on a support sleeve 41, which rests on a shoulder of the through bore 11 and by way of whose axial length the prestressing force of the valve spring 23 can be adjusted.

Figure 2:
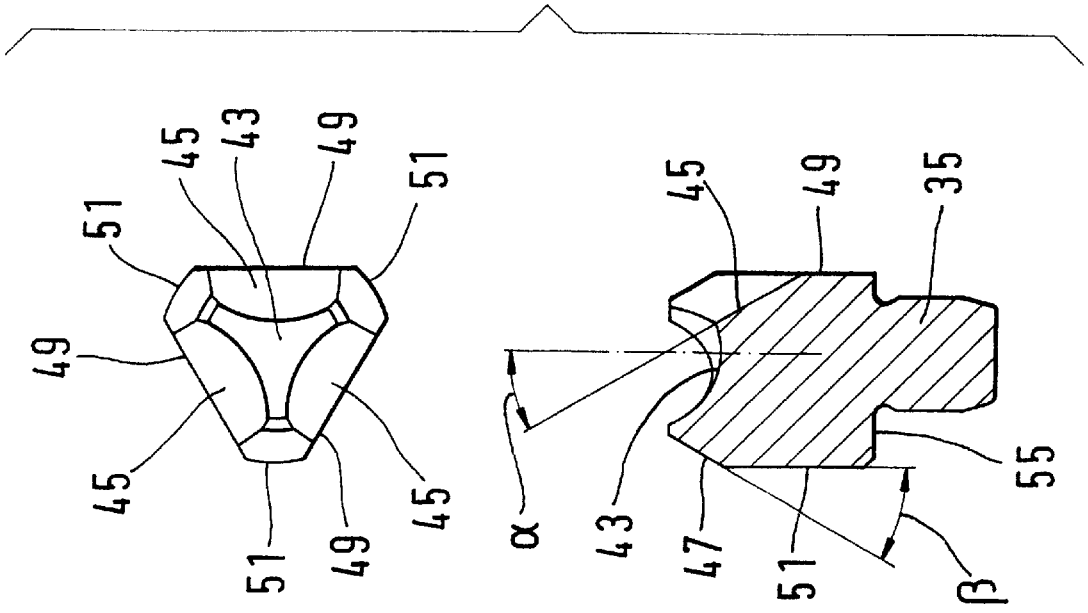

The construction of the spring plate 35 fastened between the valve ball 31 and the restoring spring 33 will now be described in terms of the enlarged fragmentary views of FIGS. 2 and 3. FIG. 2, in an enlarged detail of FIG. 1, shows a first exemplary embodiment of the spring plate 35 in two views. The spring plate 35 is embodied cylindrically, and on its upper end face, toward the valve ball 31, it has a spherical surface 43 that guides the valve ball 31 and is formed with a concave curvature into the upper end face of the spring plate 35. To prevent the creation of a backup pressure point at the line of contact between the valve ball 31 and the spring plate 35 and the build up of a back up cushion between the spherical surface 43 and the valve ball 31, obliquely disposed polished faces 45 are provided on the spring plate 35, in the exemplary embodiment shown in FIG. 2, which begin at the cylindrical circumferential wall face and open into the spherical surface 43. In this exemplary embodiment, preferably three oblique polished faces 45 are provided, distributed uniformly over the circumference of the cylindrical spring plate 35. The angle a of the oblique polished faces 45 to the longitudinal axis of the spring plate 35 is 30° in this exemplary embodiment. For improved overflow behavior of the fuel flowing past the valve ball, a radially encompassing chamfer 47 is also provided on the spring plate 35, at the transition between the radial circumferential wall face of the spring plate 35 and an axial annular end face oriented toward the valve ball 31 and surrounding the spherical surface 43. This chamfer has an angle β to the longitudinal axis of the spring plate 35 that is again 30°. To assure an unthrottled flow of fuel along the axial length of the spring plate 35, the spring plate also has axially extending polished faces 49; preferably, three polished faces 49 uniformly distributed over the circumference are provided on the spring plate 35. The axial guidance of the spring plate 35 is done via the remaining cylinder wall web regions 51, with which the spring plate 35 is guided axially slidably displaceably in the through conduit 15 of the valve body 13. For the sake of a secure contact of the restoring spring 33 with it, the spring plate 35 is additionally provided with an annular end face 55, which faces away from the spherical surface 43 guiding the valve ball 31 and is defined radially inward by an axially protruding tanglike portion.

Figure 3:
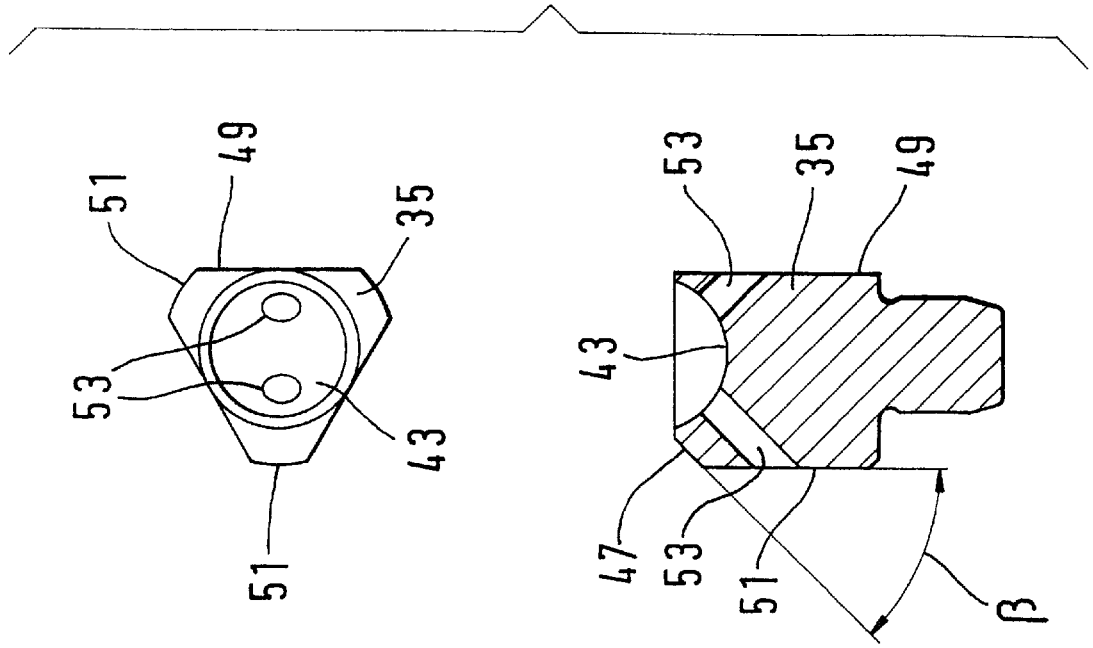

The second exemplary embodiment, shown in FIG. 3, of the pressure valve of the invention is distinguished from the first exemplary embodiment shown in FIGS. 1 and 2 solely in the embodiment of the spring plate 35. The interruptions or recesses in the spherical surface 43 of the spring plate 35, in the second exemplary embodiment shown in FIG. 3, are now embodied as bores 53, which originate at the spherical surface 43 and discharge at the outer circumferential face of the spring plate 35, obliquely to the longitudinal axis of the spring plate. The encompassing chamfer 47 in the second exemplary embodiment is also embodied with an angle of inclination β of approximately 45° to the longitudinal axis of the spring plate 35. It is especially advantageous to dispose the bores 53 as close as possible to the radially outer end of the spherical surface 43, and for instance to bring the chamfer 47 as close as possible to the spherical surface 43, to avoid the development of a backup pressure point for the fuel flowing past the entrance face of the valve ball 31 into the spherical surface 43 of the spring plate 35.

The pressure valve of the invention functions as follows. Before the onset of high-pressure pumping by the fuel injection pump, a standing pressure prevails in the feed line 3 at which the valve that opens in the injection site 7 and the reverse-flow valve 27 that opens in the opposite direction are kept closed by the force of the valve spring 23 and the restoring spring 33. The prestressing force of the valve spring 23 is made to be greater than the prestressing force of the restoring spring 33. With the onset of high- pressure pumping at the fuel injection pump, the pressure in the pump work chamber 5 rises above the opening pressure of the valve that opens in the direction of the injection site 7, so that the high fuel pressure prevailing at the first valve seat 17 in the through conduit 15 of the valve body 13 lifts the pressure valve closing member 19 from the first valve seat 17, counter to the restoring force of the valve spring 23. The fuel at high pressure first flows through the stop piece 37, along its recesses, and then flows onward along the axial polished faces 49 of the spring plate 35 and of the pressure valve closing member 19 into a spring chamber that receives the valve spring 23, and from there via the sleeve 41 and the stepped through bore 11 on into the feed line 3 to the fuel injection valve 7, protruding into the combustion chamber, and there attains injection.

Once the high-pressure pumping in the pump work chamber 5 has ended, the pressure in the feed line 3 drops very rapidly back below the necessary opening pressure of the pressure valve that opens in the direction of the fuel injection valve 7, so that the valve spring moves the pressure valve closing member 19 back into contact with the first valve seat 17. The fuel pressure wave caused by the closure of the injection valve 7 and the pressure valve member 19 in the feed line 3 decreases via the reverse-flow valve 27, to which end the fuel pressure prevailing in the through bore 25 in the pressure valve closing member 19 lifts the valve ball 31 from the second valve seat 29, counter to the restoring force of the restoring spring 33. The fuel now flows out of the feed line 3 via the stepped through bore 11 and through the through bore 25 in the pressure valve closing member 29 into the through conduit 15 in the valve body 13 back into the pump work chamber 9.

The recesses in the spherical surface 43 of the spring plate 35 that guides the valve ball 31 assure that the valve ball 31 remains in contact with the spring plate 35 and goes along with the opening stroke motion of the spring plate. The fuel located between the valve ball 31 and the spherical surface 43 of the spring plate 35 flows via the oblique polished faces 45 or the bores 53 into the through conduit 15, in which a lesser fuel pressure prevails. The development of a backup pressure point of the fuel flowing over at the valve ball 31, when the fuel strikes the spring plate 35, is averted by the chamfer 47 of the end face of the spring plate. The secure contact of the valve ball 31 with the spring plate 35 assures a uniform fuel transfer at the reverse-flow valve 27. By preventing the valve ball 31 from lifting away from the spring plate 35, on the one hand a constant opening cross section at the reverse-flow valve 27 is assured, and on the other the stress on the restoring spring 33 is reduced, since the spring plate 35 does not execute an excessively long stroke. Furthermore, the mechanical wear of the valve ball 31 and the spring plate 35 in the region of the spherical surface 43 can be lessened, since the valve ball 31 can be prevented from repeatedly striking the spring plate 35.

Once an adjustable standing pressure has been reached in the feed line 3, the force of the restoring spring 33 again exceeds the residual fuel pressure in the feed line 3 and thus presses the valve ball 31 back into a sealing contact with the second valve seat 29. The opening stroke motion of the valve ball 31 is limited by the contact of the spring plate 35 with the stop piece 37.

With the pressure valve of the invention, it is thus possible to reduce the wear to the valve ball 31, spring plate 35 and restoring spring 53 of the reverse-flow valve 27 and thus to increase the service life and reliability of the entire pressure valve.

The foregoing relates to a preferred exemplary embodiment of the invention, it being understood that other variants and embodiments thereof are possible within the spirit and scope of the invention, the latter being defined by the appended claims.

What is claimed is:

1. A pressure valve for installation in a feed line (3) between a fuel injection pump and an injection site (7) of an internal combustion engine to be supplied, comprising at least one movable valve member embodied as a valve ball (31), said valve ball is forced by a restoring spring (33) into contact with a valve seat face (29), and a spring plate (35) is provided between the restoring spring (33) and the valve ball (31) and has a spherical surface (43) that guides the valve ball (31), and a bearing face, remote from this spherical guide face, for securing the restoring spring (33), the spherical surface (43) guiding the valve ball (31) is interrupted by recesses at the spring plate (35), and the recesses in the spherical surface (43) are embodied as obliquely disposed polished faces (45).

2. The pressure valve according to claim 1, in which the recesses in the spherical surface (43) are embodied as slits.

3. The pressure valve according to claim 1, in which the cylindrical spring plate (35), at a transition between a radial circumferential wall surface and an axial annular end face oriented toward the valve ball (31) and surrounding the spherical surface (43), has a chamfer (47).

4. The pressure valve according to claim 3, in which the chamfer (47) has an angle of 30° to 45° relative to a longitudinal axis of the spring plate (35).

5. The pressure valve according to claim 1, in which the polished face (45) on the spherical surface (43) and a chamfer (47) on the end face of the spring plate (35) have an angle of inclination of about 30°, to the longitudinal axis of the spring plate (35).

6. The pressure valve according to claim 3, in which the polished face (45) on the spherical surface (43) and the chamfer (47) on the end face of the spring plate (35) have an angle of inclination of about 30°, to the longitudinal axis of the spring plate (35).

7. The pressure valve according to claim 1, in which the spring plate (35) has axial polished faces (49) on a cylindrical circumferential wall surface.

8. The pressure valve according to claim 1, in which a bearing f ace of the restoring spring (33) on the spring plate (35) is embodied as an annular end face (55).

* * * * *